United States Patent
Schelkmann

[11] 3,895,985
[45] July 22, 1975

[54] METHOD OF REPAIRING TIRES AND SHELLS USED FOR THIS METHOD

[76] Inventor: Wilhelm Schelkmann, Crengeldanzstr. 85a, D 581 Witten, Germany

[22] Filed: Apr. 10, 1973

[21] Appl. No.: 349,787

[30] Foreign Application Priority Data
Apr. 11, 1972 Germany............................ 2217293
Apr. 11, 1972 Germany............................ 2217244

[52] U.S. Cl.............. 156/96; 156/128; 156/394 FM; 264/313; 264/314; 264/315; 425/32; 425/44; 425/405 R
[51] Int. Cl.²..................... B29H 5/04; B29H 17/36
[58] Field of Search .......... 156/128, 123, 110, 394, 156/394 FM, 96; 264/313, 314, 315, 425-432, 44, 405

[56] References Cited
UNITED STATES PATENTS
| 2,014,010 | 9/1935 | Wheatley | 156/394 FM |
| 2,468,121 | 4/1949 | Shell | 156/394 FM |
| 3,207,647 | 9/1965 | Schelkmann | 156/394 FM |
| 3,745,084 | 7/1973 | Schelkmann | 156/394 FM |

FOREIGN PATENTS OR APPLICATIONS
555,689 9/1943 United Kingdom......... 156/394 FM

*Primary Examiner*—Clifton B. Cosby
*Attorney, Agent, or Firm*—Michael S. Striker

[57] ABSTRACT

A method of repairing tires in which an assembly is formed comprising a tread strip applied to the worn surface of a tire carcass with a layer of binder material sandwiched between the tread and the surface of the carcass. A pair of annular shells are applied to the tire sidewalls and seals are formed at the inner and outer edges of the shells in engagement with the tread strip and the beads of the tire. Air is then evacuated from beneath the thus-formed enclosure and the assembly with the enclosure is subjected to heat and pressure to permanently bond the tread to the tire. The enclosure may also include an annular foil surrounding the tread and shrunk thereagainst to press the tread against the worn carcass surface.

17 Claims, 14 Drawing Figures

PATENTED JUL 22 1975　　3,895,985
SHEET 1
FIG. 1　　FIG. 2　　FIG. 3　　FIG. 4
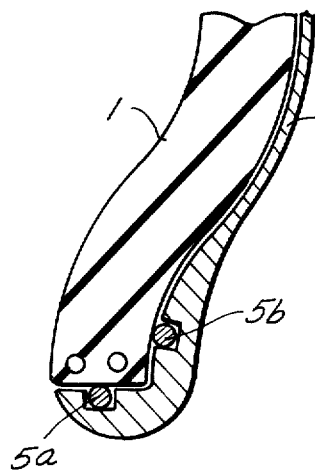
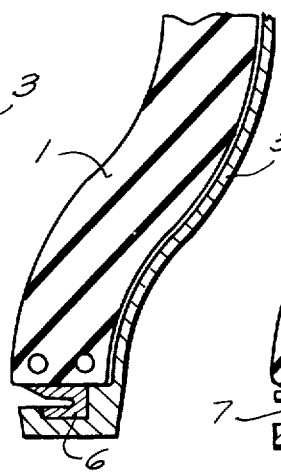
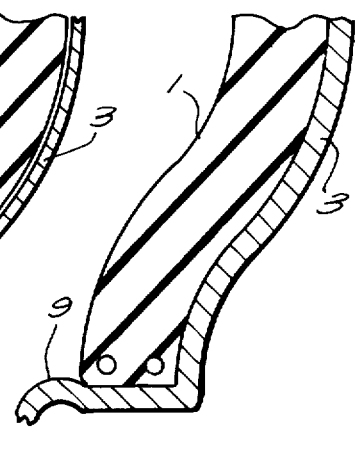
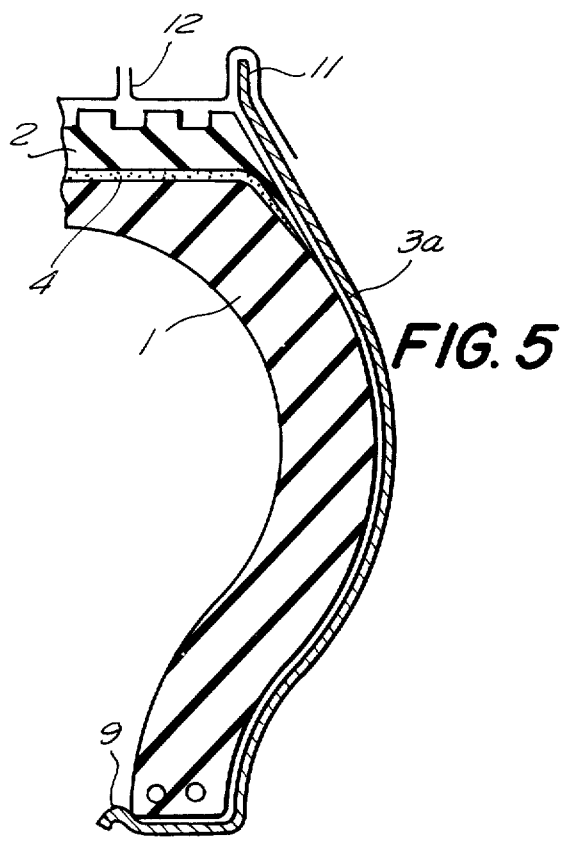
FIG. 5
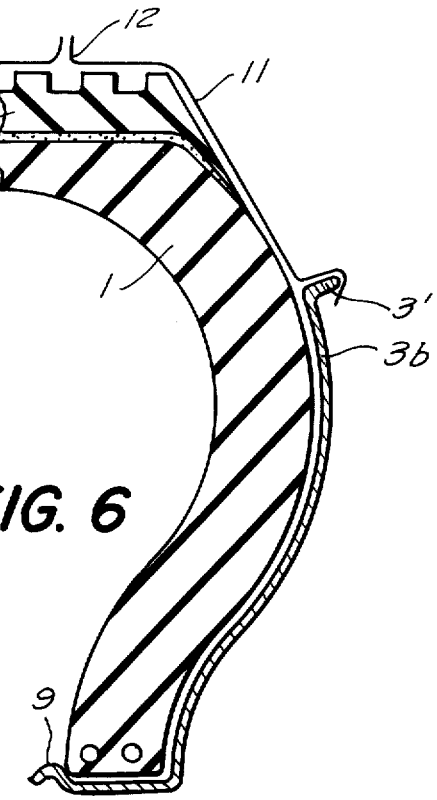
FIG. 6

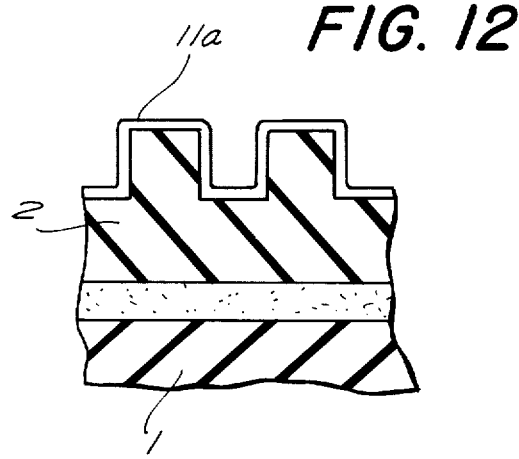
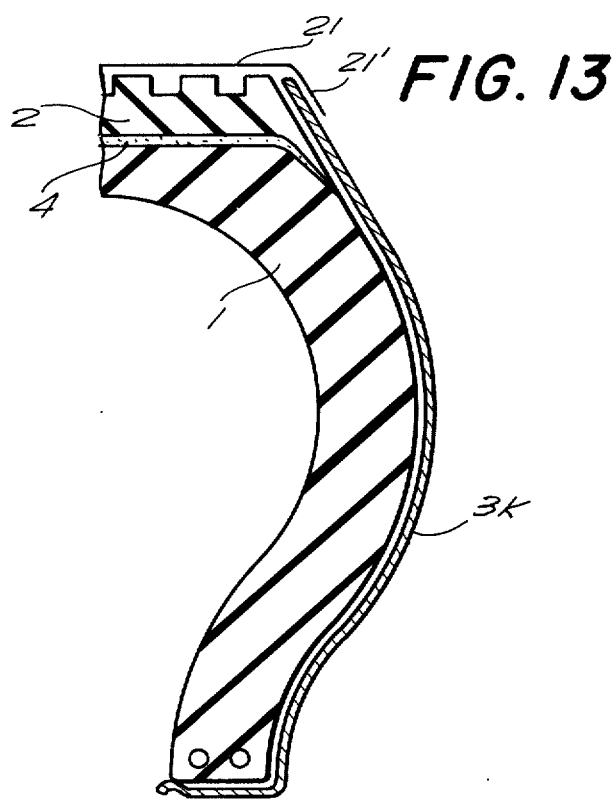
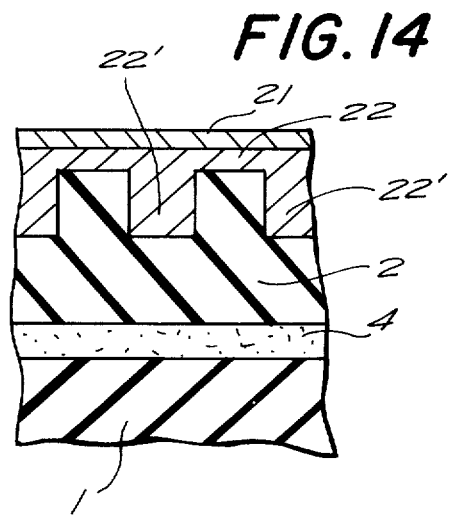

METHOD OF REPAIRING TIRES AND SHELLS USED FOR THIS METHOD

BACKGROUND OF THE INVENTION

The present invention relates to a method of repairing tires, especially the worn peripheral surface of a tire by bonding a tread strip to the worn tire surface with a layer of binder material sandwiched between the tread strip and the tire surface in which any gas enclosures between the various parts of the thus-formed assembly are evacuated and the thus-formed assembly is then subjected to heat and pressure, for instance in an autoclave, to permanently bond the tread strip by vulcanization of the tire.

Various methods are known in the art to repair tires in the aforementioned manner and in one known method the above-mentioned assembly is completely enclosed in a flexible cover sheet from which air is evacuated before the prevulcanized tread strip is vulcanized onto the tire carcass so as to preclude any air enclosures between the tread strip and the carcass. In another known method, the assembly form by the tire carcass and the tread strip is only at the outer surface of the assembly enclosed by a flexible cover sheet whereafter overpressure is applied to the interior of the tire so as to evacuate any air from the enclosure. In other known methods, the tire is vulcanized in rigid metal forms with overpressure. The disadvantage of all these methods is that only the running surface of the tire may be repaired, at most to the shoulder of such tires. A further disadvantage of these known methods is that they are cumbersome to carry out and that the enclosures for the assembly are difficult and expensive to manufacture.

SUMMARY OF THE INVENTION

It is an object of the present invention to provide for a method of repairing tires which avoids the disadvantages of such methods known in the art.

It is a further object of the present invention to provide for a method of repairing tires which can be carried out in a simpler manner than the methods known in the art and which require less expensive enclosures for carrying out the method.

It is an additional object of the present invention to provide for a method for repairing tires in which the original form of a worn tire can be restored and in which any imbalance of the repaired tire is positively prevented.

With these and other objects in view, which will become apparent as the description proceeds, the method according to the present invention of repairing tires mainly comprises the steps of forming an assembly from a tire having a U-shaped cross section and a tread strip on the peripheral surface of the tire, with a layer of binder material sandwiched between the tire surfaces and the tread strip. A pair of annular shells are then applied against the sidewalls of the tires and a fluid-tight seal is formed at the inner and outer edge of each annular shell, with the seal at the outer edge in engagement with at least a lateral portion of the tread strip so as to form an enclosure at least partly enclosing the assembly formed by the tire and the tread strip. Air is then evacuated from beneath the enclosure and the partly enclosed assembly is treated to permanently bond the tread strip to the tire.

To form the aforementioned fluid-tight seals at the inner and outer edge of the side shells, these shells may be enclosed by a flexible cover sheet which reaches from one to the other bead of the tire and the outer cover sheet and the shells may then be sealed at the tire beads. It is, however, simpler to extend the flexible cover sheet only between the outer edges of the two shells, to seal the outer edges of the two shells against the cover sheet, and to seal the inner edges of the shells against the beads of the tire. It is also possible to omit the flexible cover sheet entirely and to form the necessary enclosure only by a pair of annular shells which in this case have to be constructed in such a manner to reach at least up to or partly over opposite lateral portions of the tread strip to properly seal the outer edges of the shells against the lateral portions of the tread strip. In this case, the tread strip itself replaces the flexible cover sheet.

The annular shells may in all three of the above-mentioned methods be constructed to be self-sealing at the beads of the tire, or the shells may be sealed at the inner edges thereof by flexible cords, sealing lips or the like.

It is also possible to form the annular shells of flexible material and at the inner surface thereof with a radius of curvature smaller than the respective side face of the tire so that when the seal is applied to the side face of the tire by putting pressure on a central portion of the annular shell and subsequently relaxing the pressure, the central annular portion of each shell will resiliently snap back to create beneath the shell a partial vacuum pressing the outer and inner anular edges of the shell against the tire side face.

The method may also include application of a stabilizing ring against the outer surface of the tread strip and to seal the outer edges of the annular shells against lateral portion of this stabilizing ring so that during subsequent subjecting of the assembly to heat and pressure, no deformation of the tire carcass will occur.

According to a further development according to the present invention, the tread strip may be pressed against the carcass surface by an annular foil for example as plastic polyvinyl derivates which is shrunk onto the outer surface of the tread strip so that the latter is pressed against the worn surface of the carcass, respectively, against the layer of binder material between the tread strip and carcass surface. In this case, the outer edges of the shells are to be properly sealed against the aforementioned foil. If the tread strip is not provided with appropriate profiles, a strip provided at the inner surface thereof with appropriate profiles is sandwiched between the inner surface of the aforementioned foil and the outer surface of the tread strip so that during shrinking of the foil against the tread, the profiles on the aforementioned sandwiched strip will be pressed into the tread strip.

The annular shells are preferably formed from plastic material, or light metal, such as aluminum or aluminum alloys. The inner and outer edges of these shells are formed in such a way to facilitate forming fluid-tight seals at the inner and outer edges of the shells.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a partial cross section through a tire in the region of one bead thereof with an annular shell applied to the outer tire surface and having seals in the region of the tire bead;

FIG. 2 is a partial cross section similar to FIG. 1 in which the annular shell is provided at its inner edge thereof with a sealing lip engaging the tire bead;

FIG. 3 is a partial cross section similar to that shown in FIG. 1 in which a portion of the annular shell extends inwardly over the tire bead and is pressed thereagainst by sealing means;

FIG. 4 is a partial cross section similar to FIG. 1 in which the annular shell extends partly around the tire bead to form a fluid-tight seal;

FIG. 5 is a partial cross section of the tire and the tread strip applied against the peripheral tire surface, and wherein the outer edge of the annular shell is sealed by means of a flexible cover sheet;

FIGS. 6 and 7 are partial cross sections similar to FIG. 5 in which the annular shell and the seal of the outer edge thereof are slightly modified as compared with the embodiment shown in FIG. 5;

FIG. 11 is a partial cross section similar to FIG. 5 in which a flexible cover sheet completely encloses the annular shell and wherein the cover sheet and the shell are sealed against the bead of the tire;

FIG. 12 is a partial cross section drawn at an enlarged scale, in which the flexible top sheet, as for instance shown in FIGS. 5–7, is replaced by a thin stretchable foil resistant to high pressure so as to penetrate into the profiles of the tread strip when the interior of the enclosure is evacuated;

FIG. 13 is a partial cross section similar to FIG. 5 in which instead of a flexible top sheet, a ring is shrunk against the outer surface of the tread and against the outer edge of the shell; and FIG. 14 is a partial cross section at an enlarged scale in which a strip provided with appropriate profiled portions at the inner surface thereof is sandwiched between the foil of FIG. 13 and the tread strip.

DESCRIPTION OF THE PREFERRED EMBODIMENTS

Figure 7:
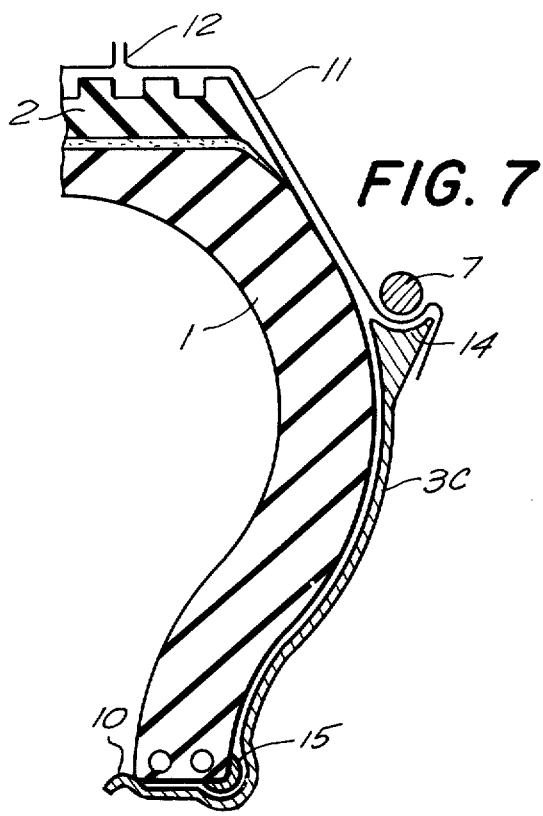

FIGS. 1–4 illustrate a portion of a tire carcass 1 in the region of the inner bead thereof and part of an annular shell 3 applied against the lateral surface of the tire carcass. It is to be understood that two of such annular shells, only partially illustrated in FIGS. 1–4, are to be applied to opposite side faces of the tire cardass. FIGS. 1–4 illustrate the manner in which the inner annular edges of the shells 3 are sealed in the region of the beads of the tire against the latter. As shown in FIG. 1, the annular shell 3, only partially illustrated therein, extends with an inner edge thereof inwardly beneath the bead of the tire carcass 1 and is provided in this inwardly extending portion with a first annular groove and in the side face thereof adjacent to the tire bead likewise with a second annular groove in which a pair of compressible cords 5a and 5b are respectively located in order to provide a fluid-tight seal between the tire bead and the inner edge of the annular shell. In FIG. 2, the inner edge of the annular shell 3 extends likewise inwardly beneath the bead of the tire carcass and forms at the inwardly extending portion a groove of substantially rectangular configuration in which a sealing lip 6 of flexible material is located to provide in this manner a fluid-tight seal between the inner annular edge of the shell 3 and the bead of the tire 1. In FIG. 3, the inner annular edge of the shell 3 extends likewise inwardly in engagement with the tire bead and is pressed thereagainst by the outer surface of a ring 8, only partially shown in FIG. 3, and a pair of cords 7 of compressible material sandwiched between the outer surface of the ring 8 and the outer surface of the inwardly extending portion of the shell 3. In FIG. 4, the annular shell 3 likewise extends inwardly beyond the bead of the tire and forms at the inner side of the tire bead a hump 9 which engages the tire bead at the inner surface thereof to thereby provide a fluid-tight seal.

In FIGS. 5–7, the outer edges of the shells 3a–3c are connected by a flexible top sheet 11, and in the embodiment shown in FIG. 5, the annular shell 3 extends with its upper or outer edge beyond the tread strip 2 applied to the peripheral surface of the tire 1 and this Figure illustrates also a layer of binder material 4 sandwiched between the inner surface of the tread strip 2 and the peripheral surface of the carcass 1. As shown in FIG. 5, a lateral portion of the flexible cover sheet 11 overlaps the upwardly extending outer peripheral edge portion of the shell 3a, and the cover sheet 11 is provided intermediate the edge portions thereof, only one of which is shown in FIG. 5, with a connecting nipple 12 for connecting air evacuating means, not shown in the drawing, thereto for evacuating air from beneath the enclosure formed by the flexible cover sheet 11 and the annular shells 3a to eliminate any air enclosures between the tread strip 2 and the peripheral surface of the tire 1. The inner annular edge of each of the shells 3a may be sealed against the bead of the tire in any of the various ways as illustrated in FIGS. 1–4, but FIG. 5 illustrates the inner annular edge of the shell 3a formed with a hump 9 engaging the tire bead at the inner surface thereof.

The modification shown in FIG. 6 differs from that illustrated in FIG. 5 in that each of the shells 3b extends only partly along the tire side face and has at the outer annular edge thereof an annular outwardly extending flange portion 3' about which an edge portion of the flexible cover sheet 11 extends and which may be clamped against the flange portion 3' by a clamping means, not shown in FIG. 6.

In the embodiment shown in FIG. 7, each of the annular shells 3c, only one of which is shown in the Figure, likewise extends only partly along the side face of the tire 1 and its outer enlarged edge is formed with an annular groove 14 and the flexible cover sheet 11 extends with the respective lateral portion thereof into and beyond the aforementioned groove and is tightly held therein by an annular resilient cord 7 pressing an edge portion of the cover sheet 11 into the groove 14 so as to provide a fluid-tight seal between the cover sheet 11 and the outer edge of the shell 3c. The inner annular edge of each shell 3c extends in this case likewise around the tire bead and engages with a hump 9 the latter, while a separate sealing strip 15 of flexible material is additionally sandwiched around the outer edge of the tire bead between the latter and a corresponding portion of the shell 3c.

Figure 8:
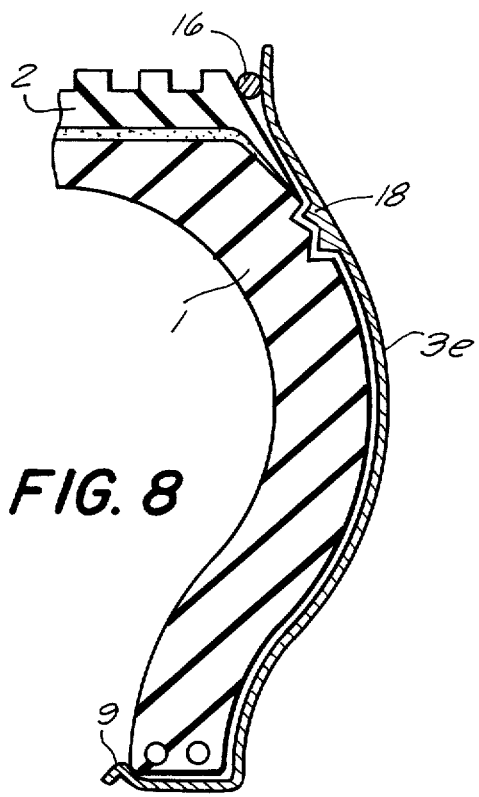
FIG. 8 is a partial cross section through a tire with a tread strip applied to the peripheral surface thereof and in which the outer edge of the annular shell is sealed against a lateral portion of the tread strip without use of any flexible cover sheet.

In the embodiment shown in FIG. 8, no flexible top sheet is used but the shell 3e extends with its outer edge beyond the periphery of the tread strip 2 and a flexible compressible cord 16 is sandwiched between the inner surface of the projecting portion of the shell 3e and a side face of the tread strip 2 so as to provide in this region a fluid-tight seal. The shell 3e is also provided at the inner surface thereof and in the region thereof which is applied to the side face of the tire 1 with projecting portions 18 in the form of figures or letters so that when the whole assembly is subjected to heat and pressure, as will be described later on, corresponding figures or letters will be impressed in the side wall of the tire. The inner annular edge of each shell 3e is sealed against the tire bead in the manner as described in connection with FIG. 4, but it is understood that different seals, as described in connection with FIGS. 1–3, may also be used for sealing the inner edge of each shell 3e against the tire bead.

Figure 9:
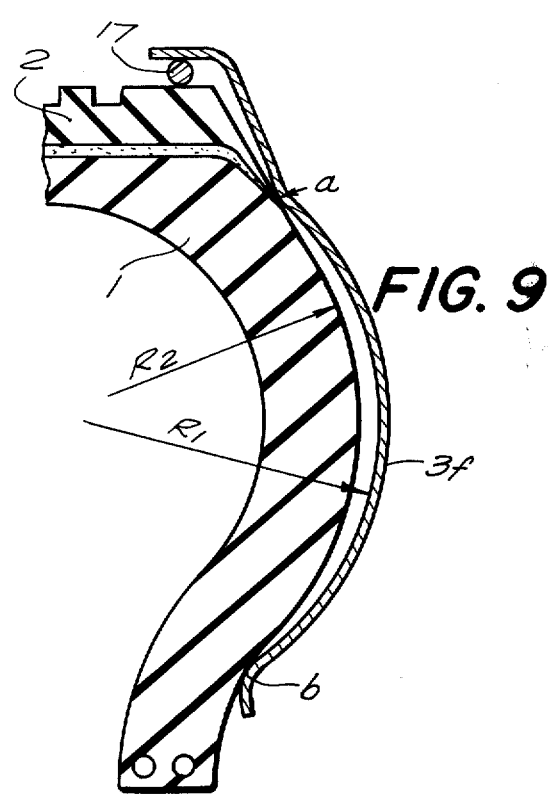
FIG. 9 is a cross section similar to that shown in FIG. 8 and showing a modified annular shell and seal.

In the modification shown in FIG. 9, each shell 3f is formed from resiliently flexible material and has at its inner surface thereof a radius of curvature $r_1$ which is smaller than the radius of curvature $r_2$ of the tire side face so that the shell 3f will engage the tire side face along annular lines shown in the cross section as the points a and b, whereby when pressure is applied in the direction of the arrow c to portions of the shell intermediate the points a and b to engage the inner surface of the shell 3f between the points a and b with the side face of the tire 1, and this pressure is subsequently released, the shell 3f will snap back to the configuration shown in FIG. 9, thereby creating a vacuum in the space between the inner surface of the shell 3f between the points a and b and the outer tire surface so that the shell 3f is thus held by atmospheric pressure against the outer tire surface. As shown in FIG. 9, the shell 3f extends with its outer edge upwardly and inwardly beyond the outer surface of the tread strip 2 and a compressible cord 17 is sandwiched between the inwardly extending portion of the shell 3f and the peripheral surface of the tread strip 2 to thereby provide an additional seal at the outer peripheral edge of the shell 3f.

Figure 10:
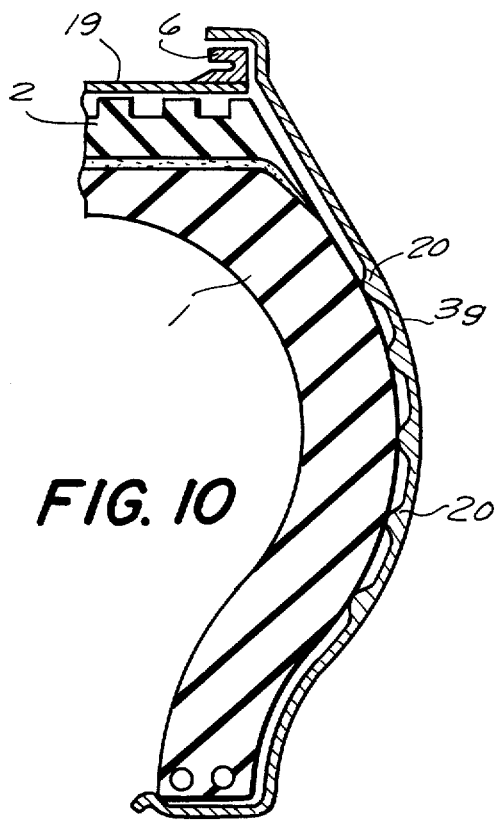
FIG. 10 is a partial cross section similar to FIG. 8 in which a stabilizing ring is applied to the outer tread surface and in which the outer edge of the annular shell is sealed by means of a sealing lip against a lateral portion of the stabilizing ring.

In the embodiment shown in FIG. 10, a stabilizing ring 19, only partially shown in FIG. 10, of substantially rigid material is applied to the outer surface of the tread strip 2, and each of the shells 3g, only one of which is shown in FIG. 10, is extended with its outer edge beyond the stabilizing ring 19 and provided with an inwardly extending flange on which a sealing lip 6 is located to form a fluid-tight seal between the outer surface of the stabilizing ring 19 and the outer annular edge of each shell 3g. A plurality of annular projections 20 may be provided spaced from each other in the inner surface of the shell 3g in engagement with the side face of the tire. The shells 3e and 3g, as shown in FIGS. 8 and 10, may also be provided with a radius of curvature which is smaller than the radius of curvature of the side face of the tire so that a partial vacuum may be created in the space between the inner surface of the shell and the outer side face of the tire, as described in connection with FIG. 9, or appropriate nipples may be connected to the shells 3e and 3g to evacuate the air in the aforementioned space by means of evacuating means connected to the nipples, not shown in FIGS. 8 and 10.

FIG. 11 illustrates a further embodiment in which the shells 3h, only one of which is shown in FIG. 11, are enclosed completely by an outer flexible cover sheet 11' which extend over the tread strip 2 and with opposite edge portions thereof beneath the tire bead. Each of the inner edge portion of the flexible cover sheet 11' is pressed against the inner annular edge of the shell 3h in the manner as described in connection with FIG. 3 by means of a ring 8 and a pair of compressible annular cords 7 sandwiched between the outer surface of the ring 8 and the outer surface of the annular edge portion of the cover sheet 11'. A connecting nipple 12 is provided on the outer cover sheet 11' so that evacuating means may be connected to this nipple 12.

In the embodiment partly illustrated in FIG. 12, a flexible top sheet 11a is used which is formed by a pressure-resistant elastically expandable foil of plastic material, for instance polyvinyl chloride, which, when the space beneath the cover sheet and the shell connected thereto is evacuated, will penetrate into the profile of the tread strip 2, as indicated in FIG. 12. The sheet 11a may be connected at peripheral portion thereof in a fluid-tight manner, as described in connection with FIGS. 5–7, or the outer peripheral portions of the cover sheet 11a may be shrunk onto the outer edges of the shells.

FIG. 13 illustrates a further embodiment for carrying out the method according to the present invention in which the shell 3k sealingly engages at the inner annular edge thereof the respective bead of the tire 1 in the manner as described in connection with FIG. 4, whereas the outer annular edge of the shell 3k extends upwardly into the region of the side face of the tread strip 2 applied to the peripheral surface of the tire 1. An annular foil 21 of heatresistant material extends about the outer periphery of the tread strip 2 and is applied thereagainst by shrinking the foil 21 against the outer surface of the tread strip, and a downwardly bent lateral portion 21' of the foil extending about the outer peripheral edge of the shell 3k is also applied thereagainst by shrinkage. Due to the pressure applied to the tread strip 2 during shrinkage of the foil 21, any air enclosures between the tread strip and the peripheral surface of the tire 1, respectively, any air enclosures between the engaging surfaces of the layer of binder material 4 sandwiched between the inner surface of the tread strip and the peripheral surface of the tire are thereby eliminated, and if necessary, each shell 3k may also be provided with a connecting nipple, not shown in FIG. 13, to evacuate any air between the inner surface of each shell and the outer side face of the tire.

If the tread strip 2 is not provided on the outer surface thereof with the necessary profile, a band 22 formed with appropriate projections 22' may also be sandwiched between the foil 21 and the outer surface of the tread strip 2 so that during shrinkage of the foil 21, appropriate profiles are pressed into the outer surface of the tread strip, as shown in FIG. 14.

The shells 3–3k are formed of resiliently flexible plastic material, for instance polyvinyl chloride, or of light metal, for instance aluminum, or shells formed of aluminum sheet material may also be provided at the inner surface thereof with a layer of polyvinyl chloride fixed thereto.

In carrying out the method according to the present invention, a prevulcanized tread strip 2 is applied to the worn peripheral surface of a tire carcass with a layer of binder material 4 sandwiched between the inner surface of the tread strip and the peripheral surface of the carcass, and the tread strip 2 may be rolled on tightly against the outer surface of the layer of binder material 4. Annular shells, as described above, are then applied against the side faces of the tire, and the inner and outer edges of these shells are then sealed against the assembly formed by the tire, the tread strip and the layer of binder material sandwiched therebetween in the manner as described above in connection with the various embodiments disclosed, whereafter any air beneath the enclosure is evacuated and the aforementioned assembly of tire carcass, tread strip and binder layer with the enclosure is subjected in an autoclave to heat and pressure so as to permanently bond the tread strip 2 to the peripheral surface of the tire carcass 1 by vulcanization.

The temperature applied to the enclosure during vulcanization must not exceed the temperature at which the shells will become softened if the latter are formed from plastic material.

It will be understood that each of the elements described above, or two or more together, may also find a useful application in other types of methods of repairing tires differing from the types described above.

While the invention has been illustrated and described as embodied in a method of repairing a tire by bonding a tread strip by vulcanization to the worn tire surface, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of repairing tires, comprising the steps of forming an assembly from a tire having a U-shaped cross-section and a tread strip on the peripheral surface of the tire with a layer of binder material sandwiched between the tire surface and the tread strip; forming a pair of shape-retaining annular shells and applying said shells against the sidewalls of the tires; forming a fluid-tight seal at the inner edge of each annular shell; forming a fluid-tight seal at the outer annular edge of each shell in engagement with at least a lateral portion of the tread strip so as to form an enclosure at least partly enclosing said assembly; evacuating air from beneath said enclosures so as to cause the sidewalls of the tires to approach the corresponding shells; and treating the partly enclosed assembly with heat to permanently bond the tread strip to said tire, whereby said shape-retaining shells prevent the tire from deforming due to the presence of heat.

2. A method as defined in claim 1, wherein said shells are formed from substantially rigid material.

3. A method as defined in claim 1, wherein said shells are formed from substantially resilient plastic material.

4. A method as defined in claim 1, wherein the step of forming a fluid-tight seal at the outer and inner edges of each shell comprises the step of enclosing said shells with an outer flexible cover sheet extending over said tread strip and from one to the other bead of the tire and fluid-tightly sealing said cover sheet and each of the shells at the tire beads.

5. A method as defined in claim 1, wherein the step of forming a fluid-tight seal at the outer edge of each shell comprises the step of placing a flexible cover sheet over the tread strip and overlapping with opposite edge portions the outer edge of each shell.

6. A method as defined in claim 1, wherein each shell is formed so that the inner edge thereof extends inwardly over the bead of the tire.

7. A method as defined in claim 6, wherein said step of forming a fluid-tight seal at the inner edge of each shell comprises the step of inserting at least one elastic cord between the tire bead and the shell in the region of the inner edge portion thereof.

8. A method as defined in claim 6, wherein the step of forming a fluid-tight seal at the inner edge of each shell comprises the step of providing a flexible sealing lip between the tire bead and the edge portion of the shell extending inwardly of the bead.

9. A method as defined in claim 6, wherein the step of forming a fluid-tight seal at the inner edge of each shell comprises applying at least one elastic cord to the outer surface of the inner edge portion of the shell and pressing the cord against the edge portion and therewith the latter against the tire bead.

10. A method as defined in claim 6, wherein the step of forming a fluid-tight seal at the inner edge of the shell comprises forming the inner edge of each shell to extend partly about and in engagement with the inner surface of the tire bead.

11. A method as defined in claim 1, wherein each shell extends with an outer edge thereof at least up to a lateral portion of said tread and wherein the step of providing a fluid-tight seal at the outer edge of each shell comprises sandwiching a profiled annular member of resilient material between the outer edge of each shell and the facing lateral edge portion of said tread.

12. A method as defined in claim 1, wherein each shell extends with an outer edge portion thereof inwardly and partly over a corresponding lateral portion of said tread, and wherein the step of providing a fluid-tight seal at the outer edge of each shell comprises sandwiching a profiled annular member of flexible material between said inwardly extending outer edge portion of each shell and the facing portion of the tread.

13. A method as defined in claim 12, and including the step of placing a stabilizing ring over the outer surface of said tread, said profiled annular member being sandwiched between the outer surface of said ring and the inner surface of said inwardly extending outer edge portion of each shell.

14. A method as defined in claim 1, and including the step of placing a heat-resistant foil over said tread which protrudes with portions thereof into the tread grooves and which extends with edge portions thereof over the outer edge of each shell, and forming a fluid-tight seal at the outer edge by shrinking said foil thereon.

15. A method as defined in claim 1, and including the step of placing a heat-resistant expandable and contractable annular member extending with edge portions thereof about the outer edge of each annular shell about the outer peripheral surface of said tread and shrinking the annular member and the edge portions thereof, respectively, against the outer surface of the tread and the outer annular edge of each shell so as to press the tread against the peripheral surface of the tire carcass and the outer edge portions of said annular member against the outer edge of each shell.

16. A method as defined in claim 15, wherein when the tread is not provided at the outer surface thereof with a profile, and including the step of sandwiching a strip provided at its inner surface thereof with a negative profile between said annular member and the outer surface of the tread so as to impress a corresponding profile onto the outer tread surface during shrinking of the annular member.

17. An annular shell to be applied to a side wall of a tire to form part of an enclosure for fluid-tightly enclosing at least a portion of the tire to be repaired during vulcanization of a rubber portion to said tire, said shell being formed of substantially resilient form-holding plastic material and being formed at its inner surface with a radius of curvature which is smaller than the radius of curvature of the side wall of the tire against which the shell is to be applied, said shell having inner and outer edge portions so that at least one of said edge portions provides, when applied to the tire, a fluid-tight seal between said edge portions and the tire, whereby said shell engages the side wall of the tire in the region of said inner and outer edge portions.

* * * * *